United States Patent [19]
Morton et al.

[11] Patent Number: 6,107,576
[45] Date of Patent: Aug. 22, 2000

[54] HINGED TOP LID FOR CABLE CHANNEL

[75] Inventors: Jason T. Morton, Raleigh; Stephen V. Judd, Franklinton, both of N.C.

[73] Assignee: Newton Instruments Company, Inc., Butner, N.C.

[21] Appl. No.: 09/031,568

[22] Filed: Feb. 26, 1998

[51] Int. Cl.[7] .............................. H02G 1/00; H02G 3/00
[52] U.S. Cl. ................... 174/101; 174/68.3; 174/70 C; 174/97
[58] Field of Search ................... 174/101, 68.3, 174/68.2, 70 C, 72 C, 97; 138/155, 156

[56] References Cited

U.S. PATENT DOCUMENTS

| | | | |
|---|---|---|---|
| 4,860,168 | 8/1989 | Wiljanen et al. | 361/428 |
| 4,942,271 | 7/1990 | Corsi et al. | 174/101 |
| 4,953,735 | 9/1990 | Tisbo et al. | 220/6 |
| 5,235,136 | 8/1993 | Santucci et al. | 174/68.3 |
| 5,645,174 | 7/1997 | Rieger et al. | 211/26 |
| 5,682,301 | 10/1997 | Kraft | 361/826 |
| 5,728,976 | 3/1998 | Santucci et al. | 174/135 |

*Primary Examiner*—Kristine Kincaid
*Assistant Examiner*—Mark Olds
*Attorney, Agent, or Firm*—Jenkins & Wilson, P.A.

[57] ABSTRACT

A cable channel and lid assembly including an elongate cable channel for supporting wire and/or optical cable therein and defining outwardly facing grooves adjacent the top edge of each side wall. A hinged top lid is provided including two opposing side walls wherein each side wall includes an inwardly extending portion for being received by a corresponding channel wall groove. One of the top lid side walls is substantially rigid and can be disengagingly raised from its associated channel wall groove, and the other of the top lid side walls is flexible and adapted to be fixedly secured in its associated groove so as to serve as a hinge when the aforesaid opposing top lid side wall is raised.

2 Claims, 4 Drawing Sheets

HINGED TOP LID FOR CABLE CHANNEL

TECHNICAL FIELD

The present invention relates generally to cable channel of the type for supporting electrical and/or optical cables therein, and more particularly to an improved lid for cable channel wherein the top lid is hinged on one side so that the other side can be raised to obtain access to the electrical wire and/or optical cables in the cable channel.

RELATED ART

The use of plastic cable channel to convey electrical wire and optical cables in telephone exchanges and similar applications such as data transmission rooms and closets, factory ceilings and cable television head-ends is well known. More particularly, the use of high impact, thermoplastic cable channel comprising a U-shaped cross section having an outer groove at the top of each side wall and a separate top element having wrap-around side edges to facilitate being slidably attached to a length of the cable channel is the current state of the art. The top lid is typically engaged along one edge and then pushed along or snapped into a length of cable channel corresponding to the length of the top lid to close the lid over the cable channel. The spring back of the channel then acts to hold the cover in place.

However, access to the cable channel when the conventional lid has been slidably secured thereto is time-consuming and difficult since the conventional lid must be either slidably removed from a length of the cable channel or the lid must be separated from a length of the cable channel by depressing the sides of the channel to effect disengagement of a length of cable channel lid. A problem with prior art detachable top lids is the tendency to lose or damage the lids during detachment from the cable channel when it is necessary to access electrical wire and/or optical cables contained within the cable channel.

Applicant has overcome the shortcomings of prior art cable channel lids with the present invention comprising a semi-permanently attached cable channel lid which is adapted to be opened and raised at one side while the other fixed side serves as a flexible hinge. The details of the novel cable channel lid will be described in more detail hereinbelow for the full appreciation by one skilled in the art.

DISCLOSURE OF THE INVENTION

In accordance with the present invention, applicant provides an elongate cable channel with an improved lid. The combination comprises an elongate cable channel adapted for supporting wire and/or optical cables therein and having a bottom and two opposing side walls such that each side wall defines an outwardly facing groove adjacent the top thereof. A hinged top lid is provided that has a top and two opposing downwardly depending side walls wherein each top lid side wall defines an inwardly extending portion adjacent to the bottom edge thereof for being received by a corresponding channel wall groove. One of the top lid side walls is substantially rigid and adapted to be disengagingly raised from its associated groove and the other of the top lid side walls is flexible and adapted to fixedly remain in its associated groove and to serve as a hinge when the aforesaid opposing top lid side wall is raised so as to open the top lid of the cable channel for easy access thereto.

It is therefore the object of the present invention to provide an improved cable channel top lid that is adapted to be easily opened for access to electrical wire and/or optical cables therein without requiring removal of the top lid from the cable channel.

It is another object of the present invention to provide an improved cable channel top lid that is hinged on one side to allow for raising the lid upwardly for easy access to the cable channel and that serves to prevent loss or unnecessary handling of the top lid.

It is still another object of the present invention to provide an improved cable channel top lid that is fixedly secured at one side to the cable channel in such a fashion that the fixed side of the top lid acts as a hinge to facilitate detachment of the other side of the top lid from the cable channel and opening of the top lid for easy access to the cable channel.

Some of the objects of the invention having been stated hereinabove, other objects will become evident as the description proceeds, when taken in connection with the accompanying drawings as best described hereinbelow.

BEST MODE FOR CARRYING OUT THE INVENTION

As is well known to those familiar with cable channel, cable channel can have many uses including carrying electrical wire and/or optical cables in telephone exchanges, controlled environment vaults, telephone central offices, telephone remote switch buildings, as well as non-telephone applications such as data transmission rooms and closets, factory ceilings and cable television head-ends. Thus, cable channel is typically intended to be used in communications applications as well as many other applications for providing a pathway for a run of electrical wire and/or optical cable.

Normally, cable channels and lids therefore are formed from plastic and the channel defines a U-shaped cable trough. Although there are many uses for cable channel in telecommunications environments, cable channel can also be used in many other applications and applicant's invention is intended to provide an improved cable channel and top lid assembly that lends itself to use in any and all environments in which conventional prior art cable channel and lid (see FIG. 1) is now used. The primary advantage of applicant's novel cable channel and hinged top lid is the semi-permanent fixation of the hinged lid to the cable channel and the ability to pivot the top lid upwardly about the axis of the hinged side of the top lid in order to provide easy access to the cable channel without requiring removal of the top lid as has been necessary heretofore and that can lead to loss or unnecessary handling of the top lid.

Figure 1:
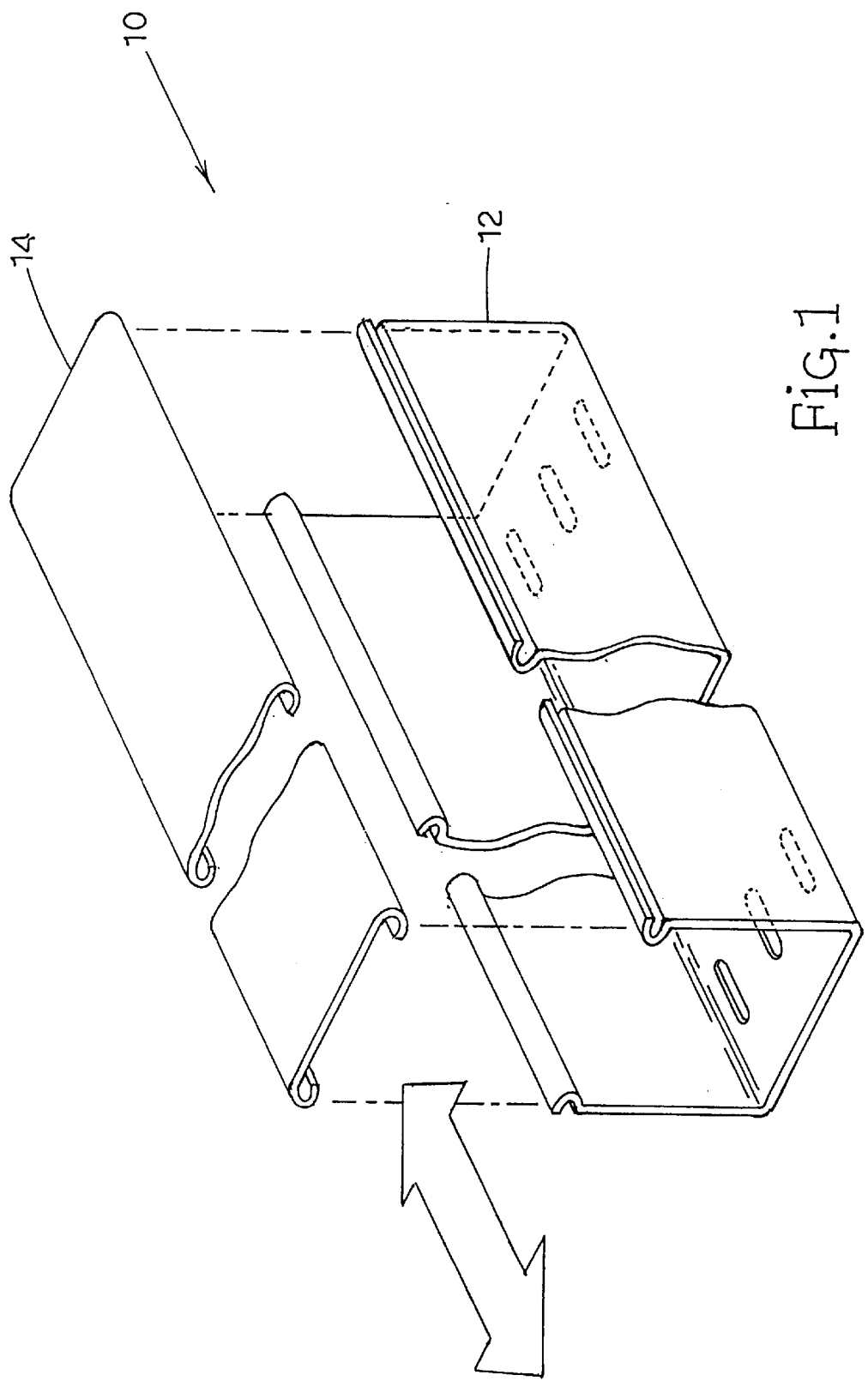
FIG. 1 is a perspective view of a prior art cable channel and removable top lid.

Referring now to the drawings, FIG. 1 shows a prior art cable channel assembly, generally designated 10, comprising the cable channel 12 and the top lid 14. Typically, electrical wires and/or optical cables are supported within the U-shaped trough defined by cable channel 12 and lid 14 serves to prevent the wire and/or optical cables from coming out of the trough. As shown by the arrow in FIG. 1, it is well known in the prior art to slidably move lid 14 in one direction or the other in order to remove or displace the lid sufficiently to gain access to the wire and/or optical cables contained therein. Also, and more commonly, lid 14 can be easily removed from channel 12 by merely squeezing the sides of channel 12 and lifting lid 14. As noted hereinbefore, removal of lid 14 is disadvantageous in view of the tendency to either lose lid 14 or unnecessarily handle lid 14 so as to potentially damage or otherwise harm the lid.

Figure 2:
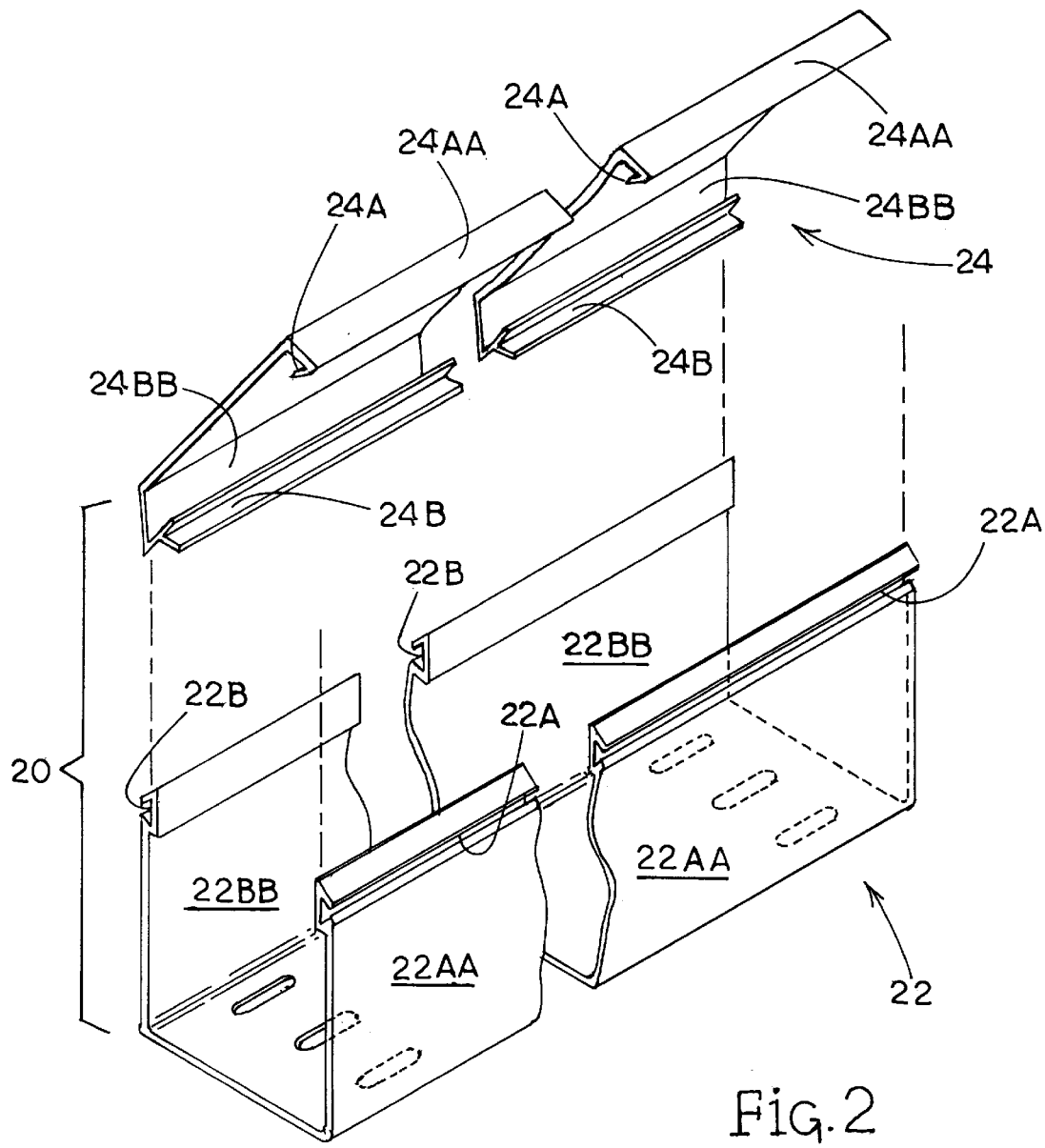
FIG. 2 is a perspective view of the cable channel and hinged top lid of the present invention.

Referring now to FIG. 2, applicant's inventive cable channel assembly, generally designated 20, is shown. Cable channel assembly 20 comprises elongate cable channel 22 and hinged top lid 24 which are shown detachably removed one from the other. As best seen in FIGS. 3A, 3B and 4A, 4B, cable channel 22 is most suitably formed from a thermoplastic material and defines outwardly extending grooves 22A, 22B adjacent the top edge of side walls 22AA, 22BB. Grooves 22A, 22B of cable channel 22 define dove-tail type grooves that substantially define a generally T-shaped type cross section wherein the T is horizontally disposed with the head within a respective groove and the base extending generally horizontally outwardly from cable channel 22.

Correspondingly, top lid 24 comprises an inwardly extending barbed latch 24A at the bottom of side wall 24AA that serves to interlockingly engage corresponding groove 22A of cable channel 22. Cable channel lid 24 further includes an inwardly extending T-shaped element 24B at the bottom of the opposing side wall 24BB thereof which is lockingly received in a dove-tail fashion within corresponding groove 22B of cable channel 22. Although element 24B is shown in a T-shaped configuration, applicant contemplates that other profiles for the inwardly extending element can be used that will serve to lockingly engage groove 22B of cable channel 22 in a dove-tail like manner.

The primary feature of T-shaped element 24B located on top lid 24 is that the element must lockingly engage groove 22B of cable channel 22 in such a fashion as to permit top lid 24 to be hinged upwardly in a manner to be described hereinafter. Although other techniques could perhaps be utilized to assemble cable channel lid 24 to cable channel 22, applicant contemplates that cable channel lid 24 will be slidably attached or snapped onto cable channel 22 by insertion of barbed latch 24A and T-shaped element 24B into corresponding grooves 22A, 22B of cable channel 22 and sliding or snappingly attaching lid 24 along the length of the cable channel until the cable channel is provided with a lid along its desired longitudinal length. Once in place, lid 24 can be raised and lowered as desired for access to cable channel 22. Applicant contemplates that the hinged side of lid 24 could be provided on either side of cable channel 22 as a matter of choice.

Figure 3A:
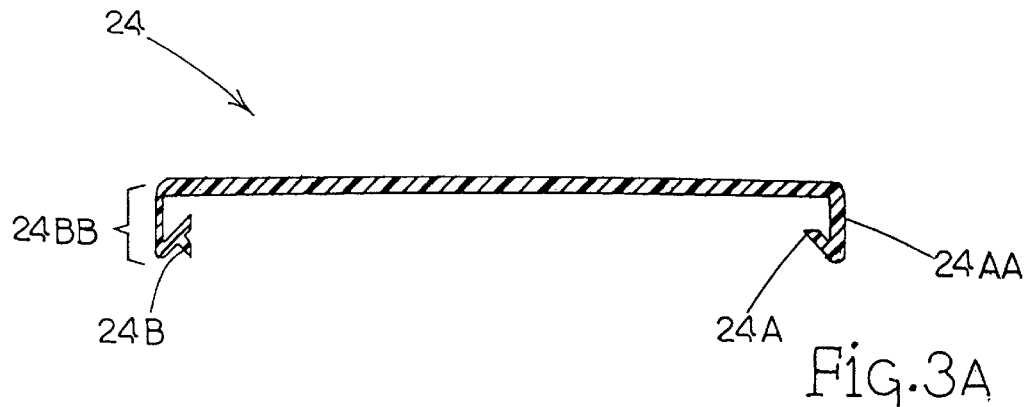
FIGS. 3A and 3B are vertical cross section views of the hinged top lid and cable channel, respectively, shown in FIG. 2.
Figure 3B:
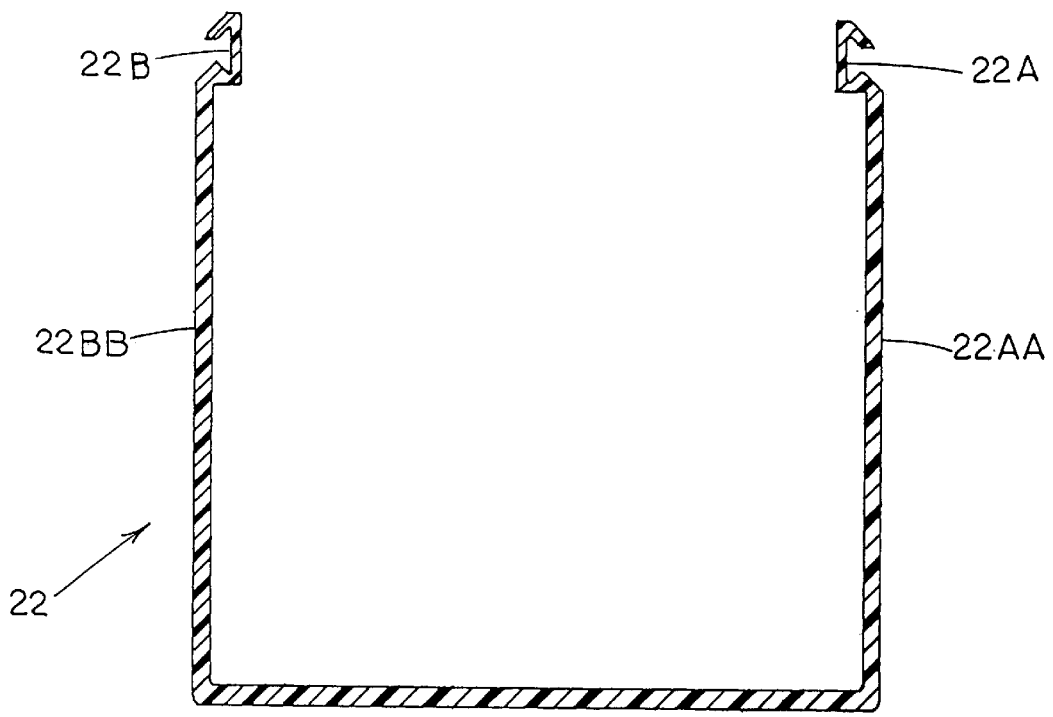
Figure 4B:
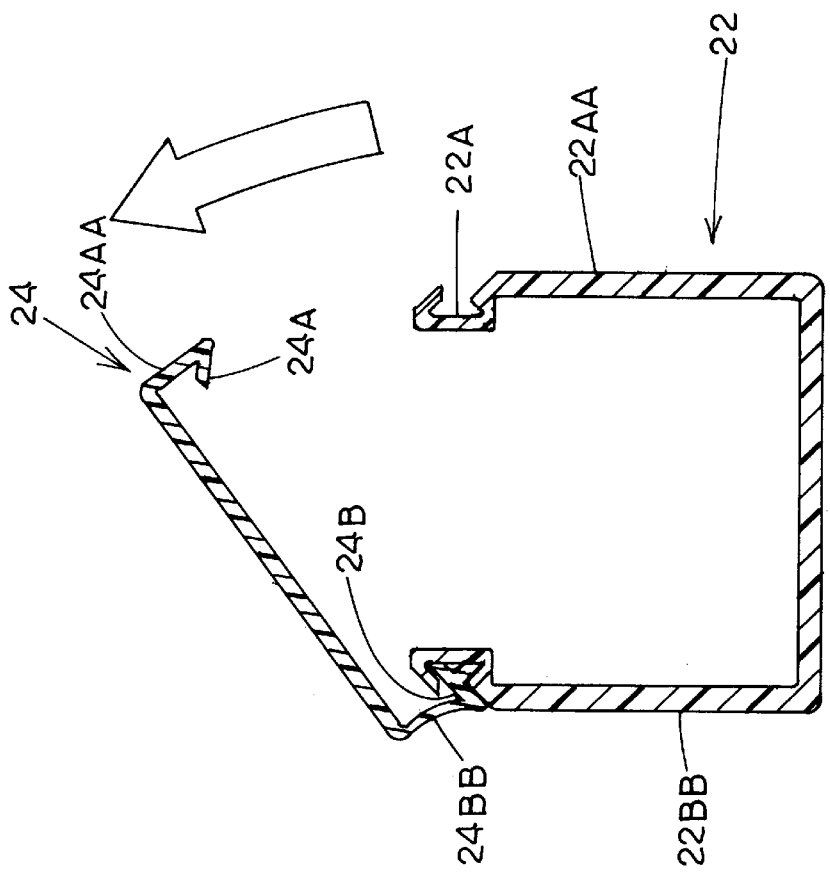
FIGS. 4A and 4B are vertical cross section views of the assembled cable channel and hinged top lid shown in FIG. 2 in the closed and open positions, respectively.
Figure 4A:
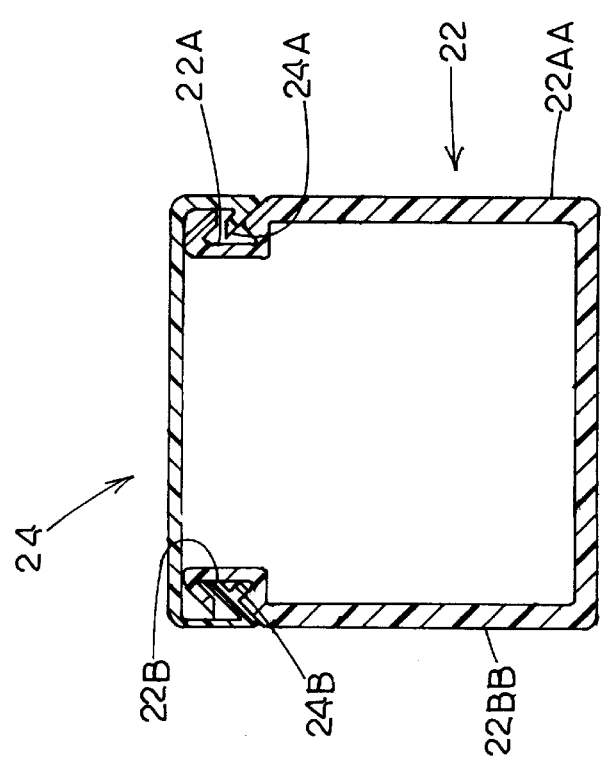

Referring now particularly to FIG. 3A of the drawings, it will be appreciated that the side wall 24BB of cable channel lid 24 which defines inwardly extending T-shaped element 24B at the lower end thereof is formed with less thickness than the top or opposing side wall 24AA of lid 24 to facilitate flexure thereof as top lid 24 is moved from its closed position (see FIG. 4A) to its open position (see FIG. 4B). In other words, when barbed latch 24A attached to associated and substantially rigid side wall 24AA is disengaged from cable channel groove 22A and raised upwardly, T-shaped element 24B extending inwardly from side wall 24BB of top lid 24 is lockingly engaged within corresponding cable channel groove 22B and relatively thin side wall 24BB flexes so as to act as a hinge and permit elevation of top lid 24 upwardly (see FIG. 4B) to provide access to the wire and/or optical cables within cable channel 22. Top lid 24 may subsequently be closed by lowering of the lid and forcing barbed latch 24A to interlockingly engage corresponding groove 22A of cable channel 22.

As will be appreciated by those skilled in the art, both cable channel 22 and cable channel top lid 24 are most likely formed of a thermoplastic material, although many other materials can be utilized and are intended to be within the scope of the present invention. In order to form a relatively thin side wall 24BB to top lid 24, the "hinge" can be made by co-extruding a thin thermoplastic material at side 24BB of lid 24 where the lid is to flex. Moreover, side wall or hinge 24BB can be selectively extruded such that top lid 24 will be biased so as to spring open when barbed latch 24A is unlatched or the lid can be biased to return to a substantially closed position subsequent to being released from an upright, open position.

It will be understood that various details of the invention may be changed without departing from the scope of the invention. Furthermore, the foregoing description is for the purpose of illustration only, and not for the purpose of limitation—the invention being defined by the claims.

What is claimed is:

1. In combination (A) an elongate cable channel adapted for supporting wire and/or optical cables therein and comprising a bottom and two opposing side walls wherein each side wall defines an outwardly facing groove adjacent the top edge thereof and (B) a hinged top lid comprising a top and two opposing downwardly depending side walls wherein each top lid side wall defines an inwardly extending portion adjacent to the bottom edge thereof for being slidably received by the groove in each said channel side wall, and wherein one of said top lid side walls is substantially rigid throughout with an inwardly extending hook on the end thereof and adapted to be disengagingly raised from its associated groove, and the other of said top lid side walls is substantially flexible throughout due to being formed of thinner plastic than the substantially rigid top lid side wall and also having an inwardly extending tongue on the end thereof so as to remain fixedly secured in its associated groove in a tongue and groove relationship and for said other top lid side wall to serve as a hinge when said opposing top lid side wall is disengagingly raised in order to open the top lid of the cable channel for access thereto.

2. In combination (A) an elongate cable channel adapted for supporting wire and/or optical cables therein and comprising a bottom and two opposing side walls wherein each side wall defines an outwardly facing groove adjacent the top edge thereof and (B) a hinged top lid comprising a top and two opposing downwardly depending side walls wherein each top lid side wall defines an inwardly extending portion adjacent the bottom edge thereof for being slidably received by the groove in each said channel side wall, and wherein one of said top lid side walls is substantially rigid and its inwardly extending portion comprises a latch member adapted to be disengagingly raised from its associated groove, and the other of said top lid side walls is substantially flexible throughout due to being formed of thinner plastic than the substantially rigid top lid side wall and also having its inwardly extending portion comprising a tongue so as to fixedly remain in its associated groove in a tongue and groove relationship so the flexible wall can serve as a hinge when said opposing top lid side wall is disengagingly raised in order to open the top lid of the cable channel for access thereto.

\* \* \* \* \*